April 15, 1941.  G. W. ROSENBERGER  2,238,602
GRAPHIC DEMAND METER
Filed Sept. 30, 1938
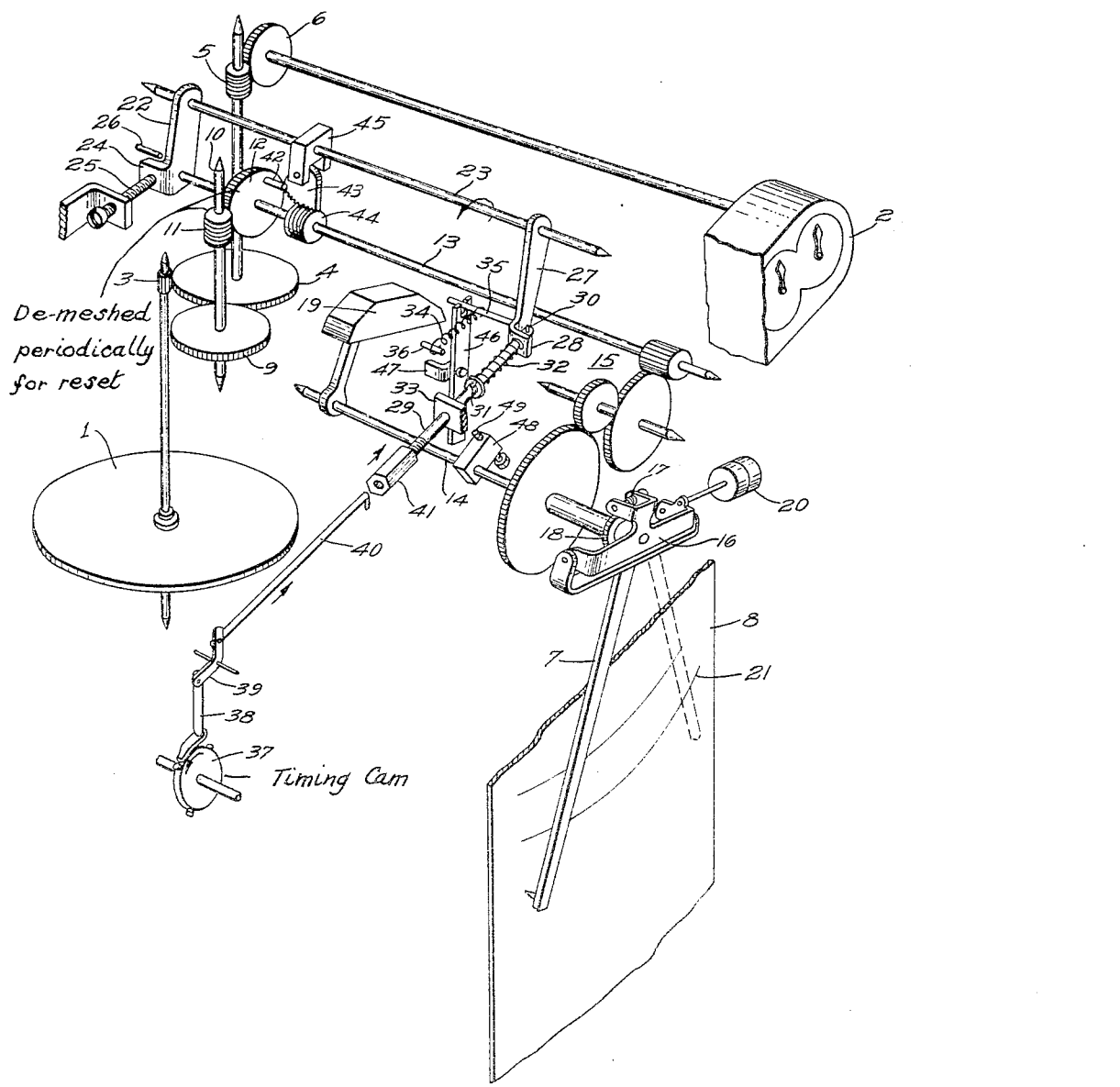
WITNESSES:
C. J. Weller.
C. L. Freedman
INVENTOR
George W. Rosenberger.
BY
ATTORNEY Patented Apr. 15, 1941

2,238,602

UNITED STATES PATENT OFFICE 2,238,602

GRAPHIC DEMAND METER

George W. Rosenberger, Bloomfield, N. J., assignor to Westinghouse Electric & Manufacturing Company, East Pittsburgh, Pa., a corporation of Pennsylvania Application September 30, 1938, Serial No. 232,62...

6 Claims. (Cl. 171—34)

This invention relates to electrical instruments and it has particular relation to electrical instruments of the graphic demand meter type.

In many instruments, an indicating member, such as a pointer or pen, travels or oscillates between fixed limits while the instrument, which drives the indicating member, operates continuously in one direction. An example of such an instrument is a graphic demand meter in which an instrument movement, which may be of the watthour meter induction type, is employed for driving a register which integrates the watthour consumption of an electrical load, and at the same time the movement actuates a pen for indicating on a chart a maximum demand for electrical energy during successive intervals, usually of 15 or 30 minutes duration.

In operation, the pen is moved from a zero position to a position corresponding to the watthour consumption for the demand period. At the end of the demand period, the pen is returned to its zero position and the chart upon which it leaves a record is advanced to receive a record for the succeeding demand interval. It occasionally happens that the release mechanism for restoring the pen to its zero position fails to operate. Under these conditions the pen would be actuated by the instrument movement past its maximum recording position until it came into contact with some obstructing part of the instrument. When this occurs, the pen would impose an excessive load on the instrument movement with a resulting increase in wear thereon, and possibly with a resultant failure of the instrument to properly integrate the watthour consumption on its integrating register. A similar condition might obtain when the demand for any demand interval is in excess of that for which the instrument is designed, with a resultant movement of the pen beyond its maximum recording position. Although such occurrences are rare, instruments of this character are intended to remain in operation without attention for extremely long periods, and for that reason it is desirable to include in the instrument a device for relieving the instrument movement of this unusual burden.

Although a friction clutch may be included in the drive for the pen arm, which is designed to slip when the pen arm engages some obstruction as outlined in the preceding paragraph, such a clutch is not entirely satisfactory. Since it must be designed to transmit power to the pen sufficient for positively moving it from its zero to its maximum recording positions, a clutch would have an undesirably high drag on the instrument movement when the pen arm encountered an obstruction, and the reliability of operation of the clutch is, of course, affected by dust and climatic conditions.

In accordance with my invention, the strain on the instrument movement is prevented when the pen arm meets an obstruction by separating a pair of gears used for transmitting power from the instrument movement to the pen arm. These same gears may be employed conveniently for releasing the pen at the end of each demand interval for permitting the return of the pen to its zero position. I have found that such a construction requires few additional parts and imposes an unusually low drag on the instrument movement when the pen arm moves past its maximum position sufficiently to cause a separation of the gears.

It is, therefore, an object of my invention to decrease the drag on an instrument movement when a member moved thereby passes a predetermined position.

It is a further object of my invention to separate a pair of gears connecting a pen arm to an instrument movement when the pen arm passes beyond a predetermined position.

It is another object of my invention to provide a pair of gears between an indicating member and an instrument movement which are released at periodic intervals to free the indicating member, and which are released when the indicating member moves beyond a predetermined position.

Other objects of my invention will be apparent from the following description taken in conjunction with the accompanying drawing, in which the single figure represents a view in perspective, with parts broken away and parts removed, of a measuring instrument embodying my invention.

Referring to the drawing, the single figure shows a graphic demand meter wherein an instrument movement, represented by a disc or armature 1 of a watthour meter movement, is employed for driving an integrating register 2 through a plurality of gears 3, 4, 5 and 6. As is customary in induction watthour meters, the register 2 provides the watthour consumption of a load over any desired billing record which ordinarily is one month.

In order to provide a record of the maximum demand occurring during a billing period, a pen arm 7 is provided for movement across a chart 8. This pen arm is moved in accordance with rotation of the disc 1 by means of a gear 9 which meshes with the gear 4. The gear 9, in turn, through a shaft 10, a worm 11, and a worm wheel 12, rotates a shaft 13 which drives a shaft 14 carrying the pen arm 7 through a gear train 15. Preferably, the pen arm 7 is hingedly mounted on a bracket 16 which is pivotally mounted on the shaft 14. Adjustment of the bracket 16 with reference to the shaft 14 is effected by rotation of a worm 17 carried by the bracket, which cooperates with a worm wheel 18 mounted on the shaft 14. A counter-balancing weight 19 for the pen arm also is mounted on the shaft 14, and the pen arm is biased toward its zero position by means of an adjustable weight 20 or any other suitable means.

The pen arm is driven across the face of the chart 8 during a demand interval to leave a mark 21 which corresponds in length to the watt-hour consumption during the demand interval. At the end of the demand interval, the pen arm 7 is returned to its zero position, and the chart 8 is moved upwardly for a short distance in preparation for a succeeding movement of the pen arm 7. The return of the pen arm to its zero position is effected by separating the worm 11 and worm wheel 12 at the end of each demand interval. This separation is made possible by mounting one end of the shaft 13 in a rotatable bearing 22, which is mounted on a shaft 23. The rotatable bearing 22 carries a stop lug 24, which may be moved into engagement with an adjustable stop 25. A stop 26 limits outward travel of the stop lug.

Rotation of the bearing 22 for separating the worm 11 and worm wheel 12 is effected through the shaft 23 by means of an arm 27, which has a projection 28 for slidably receiving an operating rod 29. Movement of the operating rod 29 with reference to the arm 27 is restricted by a pair of pins or stakes 30, 31 inserted in the rod 29 and by a compression spring 32, which is confined between the pin 31 and the projection 28. The operating arm 29 may pass through a fixed guide 33 for maintaining it in proper alignment.

The worm 11 and worm wheel 12 normally are maintained in mesh by means of a coil spring 34 which extends between a pin 35 fixed to the arm 27 and a stationary pin or support 36. Because of the spring 34 acting through the arm 27 and shaft 23, the rotatable bearing normally is positioned against the adjustable stop 25 in which position the worm 11 and worm wheel 12 are held in mesh. When the operating rod 29 is actuated to the right as viewed in the drawing, it operates through the cushioning spring 32 to rotate the arm 27, shaft 23, and bearing 22 in a counter-clockwise direction such that the lug 24 is carried toward the fixed stop 26 in which position the worm 11 and worm wheel 12 are separated.

In order to operate the rod 29 automatically at the end of each demand interval, a timing cam 37 is provided for actuating and releasing the operating arm 29 at appropriate intervals. In the specific example illustrated, the cam 37 operates through a cam follower 38, a bell crank 39, and an actuating rod 40 to engage a nut 41 adjustably threaded on the end of the operating arm 29. The timing cam 37 may be rotated by any suitable clockwork mechanism to raise and lower the cam follower 38 at the end of each demand interval which, as before stated, ordinarily is either of 15 or 30 minutes duration. Consequently, when the mechanism thus far described is in operation, the worm 11 and worm wheel 12 will be momentarily separated and re-engaged at the end of each demand interval. The period of separation of the worm 11 and worm wheel 12 is sufficient to permit the arm 7 under the influence of its biasing weight 20 to move from any position to which it has been displaced to its zero position. In order to stop the arm 7 in its zero position, a stop pin 42 is inserted in one face of the gear 12 for engagement with a movable stop segment 43. This segment is provided with gear teeth which mesh with the teeth of a worm 44 carried by the shaft 13, and is pivotally mounted on a fork 45 carried by the shaft 23. As the pen arm 7 is advanced from its zero position, the stop segment 43 is advanced by the worm 44 out of the path of the stop pin 42, thus permitting the gear 12 to make as many revolutions as required to move the pen arm 7 to its final position. When the worm and worm wheel are separated to free the pen arm 7, the pen arm, in falling back to its zero position, rotates the shaft 13 and worm 44 to return the stop segment 43 into the path of the stop pin 42.

As heretofore explained, the structure thus far described provides an acceptable record of both the watthour consumption for a billing period and the maximum demand occurring for the billing periods. However, if the timing cam 37 for some reason fails to separate the worm 11 and worm wheel 12, or if an unusually heavy demand occurs during some demand interval, the pen arm 7 will be carried beyond its maximum recording position depicted in dotted lines in the figure, until it may engage some fixed part of the instrument. When this occurs, the resistance offered by the fixed part to further movement of the arm 7 imposes an exceptionally high load on the instrument movement which may wear excessively or which may fail to operate the integrating register 2 properly because of this excessive load.

In order to relieve the instrument movement under these circumstances, a lever 46 is pivotally mounted on a bracket 47 attached to the frame of the instrument or register assembly. One end of lever 46 is slotted to receive an extension of the pin 35 and the other end of the lever 46 is positioned in the path of an arm 48 attached to the shaft 14 and carrying an adjustable screw 49 for engaging the lever 46. When the pen arm 7 is carried beyond a predetermined position such as that indicated in dotted lines in the figure, the screw 49 engages the lever 46 and rotates the lever in a clockwise direction as shown in the figure. In this rotation, the lever 46 through the pin 35 moves the arm 27, shaft 23, and bearing 22 to separate the worm 11 and worm wheel 12 from driving engagement, thereby relieving the instrument movement from an excessive load resulting from the engagement of a fixed part of the instrument with the pen arm 7.

The separation of the worm 11 and worm wheel 12 as a result of the actuation by the screw 49 is not sufficient in time duration to permit the pen arm 7 to fall back to its zero position. As a matter of fact, the operation may be so adjusted that the tips of the teeth of the worm 11 and worm wheel 12 remain in engagement momentarily and merely slip by each other as the disc 1 continues to rotate. Although this engagement is so slight that the resistance offered thereby to rotation of the disc 1 is negligible, it is sufficient to prevent the return of the pen 7 to its zero position. Consequently, the pen arm 7 will remain in its advanced position until the timing cam 37 operates to release the pen arm or until the meter reader notes that the meter is operating improperly.

It is believed that the operation of the mechanism described above is apparent. Recapitulating the operation briefly, rotation of the disc 1 continuously advances the integrating register 2 in accordance with the load being measured by the instrument. Rotation of the disc 1 also carries the pen arm 7 across the chart 8 for a distance in each demand interval corresponding to the load demand for the interval. At the end of each interval, the timing cam 37, through its connecting mechanism, rotates the bearing 22 to separate the worm 11 and worm wheel 12, thereby permitting the pen arm 7, under the influence of its biasing weight 20, to return to its zero position as determined by the stop pin 42 which engages the stop segment 43 in the zero position of the pen arm. If the pen arm 7 should be carried beyond a predetermined position, such as that indicated in dotted lines, the adjustable screw 49 through the lever 46 and associated mechanism rotates the bearing 22 sufficiently to reduce the load on the disc 1 without necessarily permitting the pen arm 7 to fall back to its zero position. The return of the pen arm under these circumstances is effected by proper operation of the timing cam 37 or by the meter reader who, at the end of the billing period, notices the advanced position of the pen arm.

Referring to the operation of the apparatus illustrated in the drawing in greater detail, it should be noted that the timing cam 37 rotates continuously in the direction of the arrow at a uniform rate. At the end of each demand interval which, as above indicated, may be of 15 minutes' duration, one of the protuberances on the timing cam momentarily engages and lifts the cam follower 38. This, in turn, rotates the bell crank 39 in a clockwise direction and the bell crank forces the actuating rod 40 to the right, as indicated by the arrow, into engagement with the nut 41 on the operating arm 29. Under the influence of this actuation, the operating arm 29 moves to the right, as indicated by the arrow, and carries with it the arm 27.

The movement of the arm 27 operates to rotate the shaft 23 in a counterclockwise direction, as indicated by the arrow surrounding the shaft. In rotating, the shaft 23 carries with it the bearing 22 into engagement with the stop 26. Since the shaft 13 is supported at one end by the bearing 22, the movement of the bearing operates to separate the worm 11 and worm wheel 12. The shaft 13 consequently is free to rotate in response to the bias of the adjustable weight 20 in order to permit the return of the pen arm 7 to its initial position, shown in full lines in the drawing.

When the timing cam 37 has advanced sufficiently for a protuberance to clear the cam follower 38, the various parts return to the positions indicated in the drawing, with the worm 11 and worm wheel 12 again in mesh. In this condition, the apparatus again is effective to advance the pen arm 7 to a position corresponding to the demand for a succeeding time interval.

If the pen arm 7 for any reason should be advanced beyond the position shown in dotted lines, the adjustable screw 49 is carried into engagement with the lever 46. This lever, through the pin 35 tends to rotate the arm 27 and the shaft 23 in a counterclockwise direction as indicated by the arrow around the shaft. Such movement of the shaft 23 rotates the bearing 22 towards the stop 26 and separates the gears 11 and 12.

When the separation movement of the worm 11 and worm wheel 12 is just sufficient to permit one of the teeth on the worm wheel 12 to slip past the teeth of the worm 11, the pen arm 7 tends to fall back towards its initial position. However, as the pen arm starts to fall back towards its initial position, the adjustable screw 49 is carried away from the lever 46 and this release of the lever 46 permits the worm and worm wheel to return into full engagement. As a matter of fact, a slight oscillation of the pen arm is produced by the slippage of the worm and worm wheel 11 and 12, but this is so imperceptible that it could hardly be noticed by the naked eye.

Consequently, when the pen arm 7 is advanced beyond the position shown in dotted lines, the teeth on the worm 11 tend to ride over the teeth on the worm wheel 12 without advancing further the pen arm. Because of the prompt return of the worm and worm wheel into full engagement when the screw 49 leaves the lever 46, the pen arm 7 is held substantially in the position shown in dotted lines. This slippage of the teeth on the worm and worm wheel is accompanied by so little friction that the drag imposed thereby on the meter disc 1 is not objectionable.

Although I have described my invention with reference to a specific embodiment thereof, it is obvious that numerous modifications thereof are possible. Therefore, I do not wish my invention to be restricted except as required by the appended claims when interpreted in view of the prior art.

I claim as my invention:

1. In an instrument, movable indicating means, means for moving said indicating means in accordance with a variable quantity to be measured including a coupling device, means cooperating with said coupling device for restoring said indicating means to a predetermined condition at predetermined time intervals, and means effective if said indicating means passes its intended maximum indicating position for rendering said coupling device ineffective.

2. In an instrument, a movable element, means for actuating said element in accordance with a variable quantity to be measured including a coupling device, means for momentarily releasing said coupling device at predetermined time intervals, and means for releasing said coupling device if said movable element reaches a predetermined position.

3. In an instrument, movable indicating means biased towards a first position, means for moving said indicating means against said bias in accordance with a variable quantity to be measured including a pair of gears normally biased in meshing engagement, means for restoring said indicating means to a predetermined condition at predetermined time intervals, and means responsive to movement of said indicating means to a predetermined position for rendering said meshing engagement ineffective for advancing said indicating means.

4. In an instrument, movable indicating means biased towards a first position, means for moving said indicating means against said bias including a coupling device, and means effective when said indicating means is moved to a predetermined position for decreasing said coupling to a value insufficient for advancing said indicating means against said bias, but sufficient for retaining said indicating means substantially in said predetermined position.

5. In a demand instrument, a maximum demand indicator, a first gear, means for rotating said gear in accordance with a quantity to be measured, a shaft, a pair of spaced bearings for said shaft, one of said bearings being mounted for rotation about an axis spaced from said shaft, a second gear mounted on said shaft, said gears being normally biased in driving engagement, and means for rotating said rotatable bearing for demeshing said gears including a first actuating device for periodically oscillating said rotatable bearing and a second actuating device for rotating said rotatable bearing in response to movement of said indicator past a predetermined position.

6. In a maximum demand measuring instrument, means movable to a position during each of a plurality of predetermined time intervals corresponding to the demand for each of said intervals, actuating means for moving said movable means in accordance with a variable quantity to be measured to said position for each of said time intervals and for releasing said movable means at the end of each of said time intervals, and means responsive to the position of said movable means for preventing a further movement of said movable means by said actuating means.

GEORGE W. ROSENBERGER.